US010656932B2

(12) United States Patent
Hatch (10) Patent No.: US 10,656,932 B2
(45) Date of Patent: May 19, 2020

(54) RADIO UPDATING METHOD

(71) Applicant: United Radio, Inc., East Syracuse, NY (US)

(72) Inventor: Daniel Hatch, Tully, NY (US)

(73) Assignee: United Radio, Inc., East Syracuse, NY (US)

( * ) Notice: Subject to any disclaimer, the term of this patent is extended or adjusted under 35 U.S.C. 154(b) by 171 days.

(21) Appl. No.: 15/207,714

(22) Filed: Jul. 12, 2016

(65) Prior Publication Data

US 2018/0018156 A1 Jan. 18, 2018

(51) Int. Cl.
*G06F 8/65* (2018.01)
*H04L 12/24* (2006.01)

(52) U.S. Cl.
CPC ............. *G06F 8/65* (2013.01); *H04L 41/082* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 3,404,786 A * | 10/1968 | Valleteau De Moulliac | B61G 7/10 213/100 W |
| 4,042,201 A * | 8/1977 | O'Callaghan | B60R 11/0205 248/309.1 |
| 5,054,115 A * | 10/1991 | Sawa | H04B 1/3877 455/571 |
| 6,948,226 B2 * | 9/2005 | Chernoff | B62D 33/02 29/428 |
| 7,177,730 B2 * | 2/2007 | Daly | B60R 11/0211 307/9.1 |
| 7,409,275 B2 * | 8/2008 | Sakurai | G07C 5/008 340/438 |
| 8,059,830 B1 * | 11/2011 | Gleason | H04R 5/04 381/86 |

(Continued)

OTHER PUBLICATIONS

Y. Onuma, Y. Terashima, S. Nakamura and R. Kiyohara, "A method of ECU software updating," 2018 International Conference on Information Networking (ICOIN), Chiang Mai, 2018, pp. 298-303. (Year: 2018).*

(Continued)

*Primary Examiner* — Wei Y Zhen
*Assistant Examiner* — Binh Luu
(74) *Attorney, Agent, or Firm* — Bond, Schoeneck & King, PLLC; Blaine Bettinger; George McGuire (57) ABSTRACT

A method and system for upgrading software stored on a hardware unit is provided. The method includes the steps of: (i) connecting a plurality of hardware units to a computer, the computer including an upgrade algorithm; (ii) scanning, by the upgrade algorithm, for the presence of the plurality of hardware units; (iii) querying, by the upgrade algorithm, each of the plurality of hardware units for information about the software stored on the respective hardware unit; (iv) determining, by the upgrade algorithm, that an upgrade is available for the software stored on at least one of the plurality of hardware units; (v) installing the available upgrade on the at least one of the plurality of hardware units; and (vi) receiving, from the upgrade algorithm, an indication that the installation was successful on at least one of the plurality of hardware units.

16 Claims, 5 Drawing Sheets

(56) References Cited

U.S. PATENT DOCUMENTS

| | | | | |
|---|---|---|---|---|
| 8,548,646 B1* | 10/2013 | Gariepy | ............ | G05B 19/0428 318/568.12 |
| 8,589,793 B2* | 11/2013 | Link | ............ | B60K 35/00 715/718 |
| 8,607,015 B2* | 12/2013 | Miyata | ............ | G11B 19/02 711/166 |
| 8,978,948 B2* | 3/2015 | Tujague | ............ | B60R 11/0258 224/483 |
| 9,608,976 B2* | 3/2017 | Tamp | ............ | H04L 67/141 |
| 9,936,065 B2* | 4/2018 | Shannir | ............ | H04M 1/72577 |
| 9,960,496 B2* | 5/2018 | Kim | ............ | H01Q 13/06 |
| 10,061,574 B2* | 8/2018 | Mueller | ............ | G06F 8/65 |
| 2008/0005733 A1* | 1/2008 | Ramachandran | ............ | G06F 8/65 717/168 |
| 2009/0018717 A1* | 1/2009 | Reed | ............ | A01B 69/008 701/25 |
| 2010/0280774 A1* | 11/2010 | Ewing | ............ | H04Q 9/00 702/60 |
| 2011/0307882 A1* | 12/2011 | Shiba | ............ | G06F 8/65 717/173 |
| 2014/0282470 A1* | 9/2014 | Buga | ............ | G06F 8/65 717/170 |
| 2015/0113521 A1* | 4/2015 | Suzuki | ............ | G06F 8/65 717/173 |
| 2015/0253829 A1* | 9/2015 | Palmer | ............ | G06F 1/28 713/300 |
| 2016/0364225 A1* | 12/2016 | Moeller | ............ | G06F 8/65 |
| 2017/0117940 A1* | 4/2017 | Cafe | ............ | H05K 7/1498 |
| 2017/0337051 A1* | 11/2017 | Bertani | ............ | G06F 8/65 |
| 2017/0364869 A1* | 12/2017 | Tarte | ............ | G06Q 10/1095 |
| 2018/0095742 A1* | 4/2018 | Richter | ............ | G06F 8/65 |
| 2018/0095745 A1* | 4/2018 | Mine | ............ | G06F 8/65 |

OTHER PUBLICATIONS

Y. Onuma, Y. Terashima and R. Kiyohara, "ECU Software Updating in Future Vehicle Networks," 2017 31st International Conference on Advanced Information Networking and Applications Workshops (WAINA), Taipei, 2017, pp. 35-40. (Year: 2017).*

* cited by examiner

RADIO UPDATING METHOD

FIELD OF THE INVENTION

The present invention relates to methods and systems for updating radio units, and more specifically to methods and systems for simultaneously updating the software of multiple radio units.

BACKGROUND

Modern radio receivers are sophisticated computers that receive, process, and output a wide variety of information. For example, in addition to normal programming, many radio transmissions are accompanied by metadata about the programming. For music programming, for example, the metadata may include the lyricist, arranger, performer, title of the song, length of the song, and/or other information. The metadata may also include commercial information and/or advertising. Usually, some or all of this metadata is displayed to the user.

Radio receivers may also be multi-functional. For example, many radio receivers are combined with a GPS receiver and thus possess a digital display for the radio functions as well as for maps displayed in conjunction with the GPS receiver. In addition to GPS, radio receivers can also comprise other functions, such as outer camera displays including back-up cameras, and many, many other functions.

Since radio receivers comprise programming for all of these functions, and since this programming—like all programming—is periodically updated for security reasons, to improve functionality, and/or to offer new functionality, then the radio receivers are preferably connected at one time or another to an external computer in order to update the programming. This can be, for example, during repair or maintenance of the car, when the car is sold or refurbished, or at many other times.

Current programming update methods require that radio receivers be connected one-by-one to an external computer which then communicates with the radio receiver and updates the programming. This method is slow and inefficient, especially if many radio receivers are ready for updates. The method can also be inefficient if there are multiple different kinds or versions of radio receivers, and/or if there are similar radio receivers but with different versions of programming that must be updated.

Accordingly, there is a continued need in the art for efficient methods and systems to update the programming of radio receivers.

SUMMARY OF THE INVENTION

The present disclosure is directed to methods and systems for updating the programming of a radio receiver. For example, the method comprises a computerized system capable of interfacing with multiple radio receivers at one time, and simultaneously updating the multiple radio receivers. The radio receivers may be, for example, different models and/or may comprise different program versions to be updated.

According to an aspect is a method for upgrading software stored on a hardware unit. The method comprises the steps of: (i) connecting a plurality of hardware units to a computer, the computer comprising an upgrade algorithm; (ii) scanning, by the upgrade algorithm, for the presence of the plurality of hardware units; (iii) querying, by the upgrade algorithm, each of the plurality of hardware units for information about the software stored on the respective hardware unit; (iv) determining, by the upgrade algorithm, that an upgrade is available for the software stored on at least one of the plurality of hardware units; (v) installing the available upgrade on the at least one of the plurality of hardware units; and (vi) receiving, from the upgrade algorithm, an indication that the installation was successful on at least one of the plurality of hardware units.

According to an embodiment, the hardware unit is a radio unit and/or a GPS unit.

According to an embodiment, the determining step comprises the step of comparing the information about the software stored on the respective hardware unit to a database, the database comprising information about software and available upgrades.

According to an embodiment, at least one of the plurality of hardware units comprise software which is different from software stored on at least one of the remainder of the plurality of hardware units.

According to an embodiment, the method further includes the steps of: receiving, from the upgrade algorithm, an indication that the installation was not successful on at least one of the plurality of hardware units; re-installing the available upgrade on the at least one of the plurality of hardware units; and receiving, from the upgrade algorithm, an indication that the installation was successful on the at least one of the plurality of hardware units.

According to an embodiment, the querying step comprises querying each of the plurality of hardware units for information about a make and/or model of the hardware unit.

According to an aspect is a system for upgrading software stored on a hardware unit. The system includes: a plurality of hardware units, each of the plurality of hardware units comprising stored software; a communications link; and an upgrading computer connected to each of the plurality of hardware units by the communications link, wherein the upgrading computer comprises a processor configured to: (i) scan to confirm that the plurality of hardware units are connected to the upgrading computer; (ii) query each of the plurality of hardware units for information about the software stored on the respective hardware unit; (iii) determine that an upgrade is available for the software stored on at least one of the plurality of hardware units; (iv) install the available upgrade on the at least one of the plurality of hardware units; and (v) provide an indication that the installation was successful on at least one of the plurality of hardware units.

According to an embodiment, the system further includes a hardware unit rack into which the plurality of hardware units is connected, wherein the hardware unit rack provides power to each of the plurality of hardware units.

According to an aspect is a method for upgrading software stored on a hardware unit. The method includes the steps of: (i) providing an upgrade system, the upgrade system comprising: a plurality of hardware units, each of the plurality of hardware units comprising stored software; a communications link; and an upgrading computer comprising a processor, wherein the upgrading computer is connected to each of the plurality of hardware units by the communications link; (ii) querying, by the processor, each of the plurality of hardware units for information about the software stored on the respective hardware unit; (iii) determining, by the processor, that an upgrade is available for the software stored on at least one of the plurality of hardware units; (iv) installing the available upgrade on the at least one of the plurality of hardware units; and (v) providing an indication that the installation was successful on at least one of the plurality of hardware units.

According to an embodiment, the computer further includes a user interface, and the indication is provided via the user interface.

These and other aspects of the invention will be apparent from reference to the embodiments described hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION

The present disclosure describes various embodiments of a method and system for updating the programming of a radio receiver. The method comprises a computer that is configured to direct interface with a plurality of radio receivers simultaneously. The computer communicates directly with each of the plurality of radio receivers to determine what update, if any, the radio receiver requires. The computer then provides and applies the update.

Although several of the embodiments described herein comprise a radio unit, it is important to note that the invention covers other hardware units encompassing software that may require upgrading. For example, instead of radio units, a component such as a stand-alone GPS receiver or other similar device may be utilized.

Figure 1:
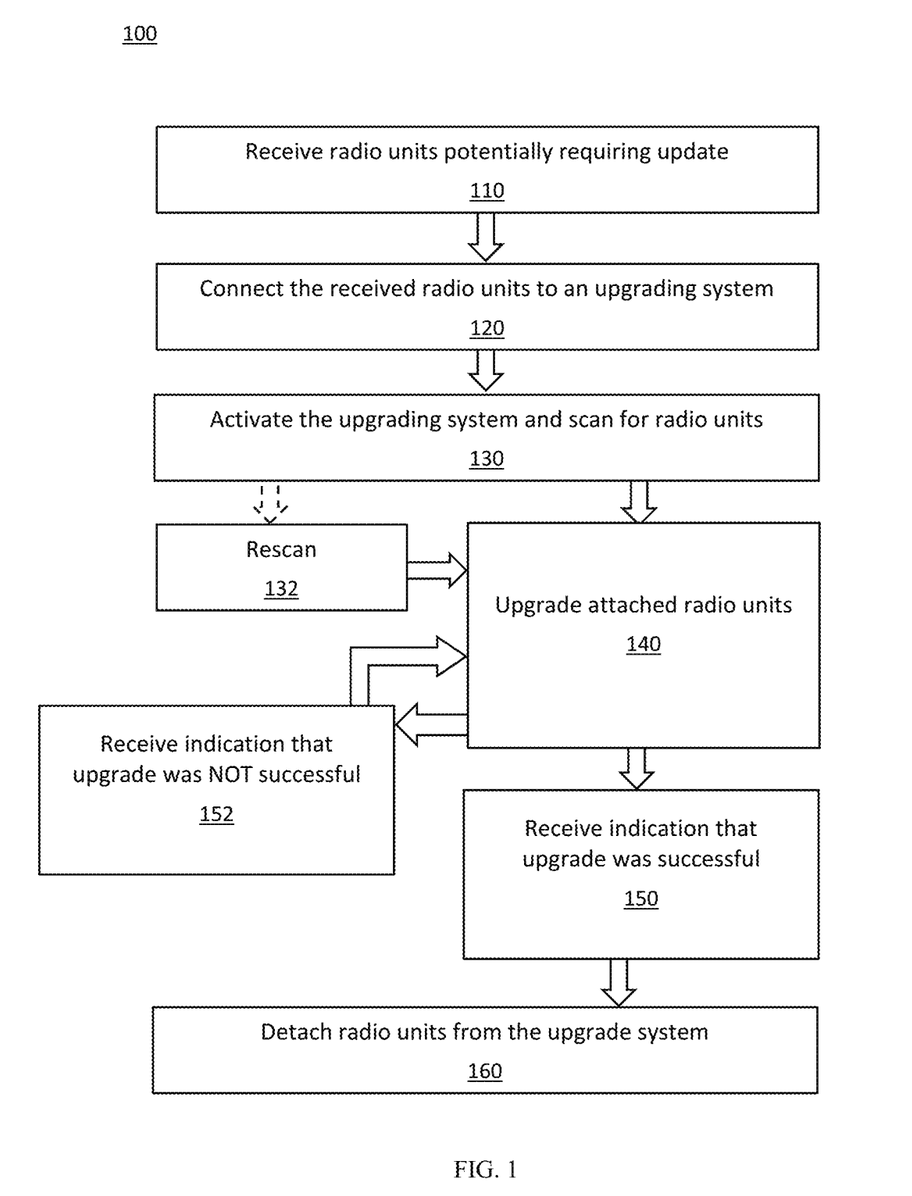
FIG. 1 is a flowchart of a method for updating the programming of a radio receiver, in accordance with an embodiment.

Referring to FIG. 1, in one embodiment, is a flowchart of a method 100 for updating the programming of a radio receiver. At step 110 of the method, one or more radio units are received, some or all of which may require a software update or upgrade. The units may be received by, for example, any entity, such as an upgrading entity, that is responsible for maintaining, repairing, providing, and/or upgrading radio units. For example, the upgrading entity may be an entity that contracts with or otherwise engages with a radio unit providing entity to process orders. The radio unit providing entity can be, for example, a vehicle dealership or any other entity that sells, rents, or transfers radio units. For example, the radio unit providing entity can be a vehicle dealership that identifies radio units that require or potentially require an upgrade, either alone or as part of a repair or maintenance of that radio unit.

At step 120 of the method, the one or more radio units are connected to an upgrading system. For example, the system may comprise an upgrading computer that comprises an upgrading program to assist in the upgrading process. Accordingly, an upgrading computer may comprise a non-transitory storage medium that stores the upgrading program or software or algorithm, as well as a processor that executes the software or algorithm. The upgrading computer will also comprise an external wired and/or wireless communications link to establish communication with the plurality of radio units.

According to an embodiment, the system comprises a harness that can accommodate a plurality of radio units at one time. Each radio unit plugs into the harness, which is in turn connected to a power source. This provides power to each of the individual radio units. The radio units are then connected individually to the upgrading system. For example, if the radio units comprise a USB port, the USB port can be used to connect to the upgrading system. Each individual radio unit can be connected by a separate USB and wire to the upgrading computer or system, or there may be one or more USB or other hubs that connect the radio units to the upgrading computer or system.

Figure 3:
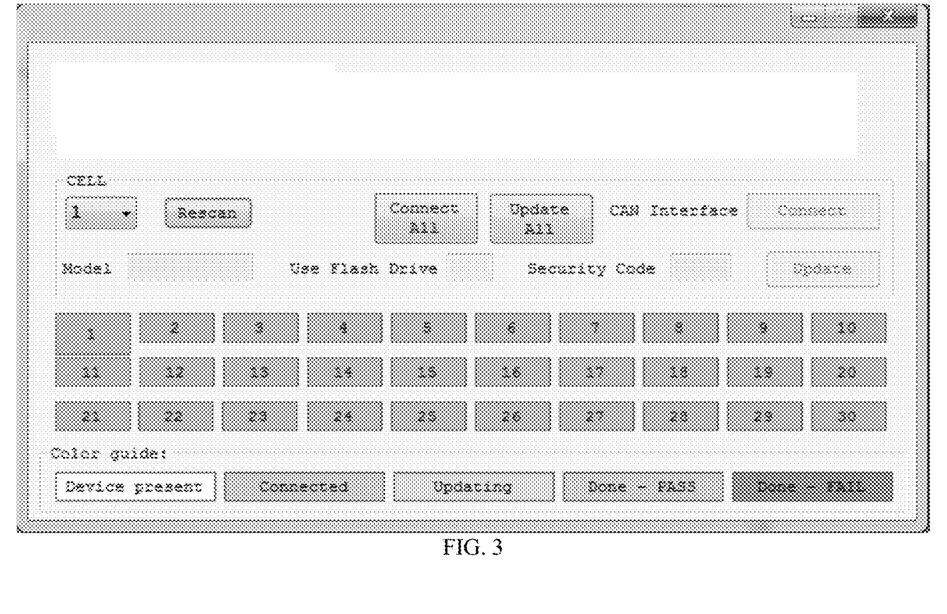
FIG. 3 is a schematic representation of a user interface for an upgrading system, in accordance with an embodiment.
Figure 4:
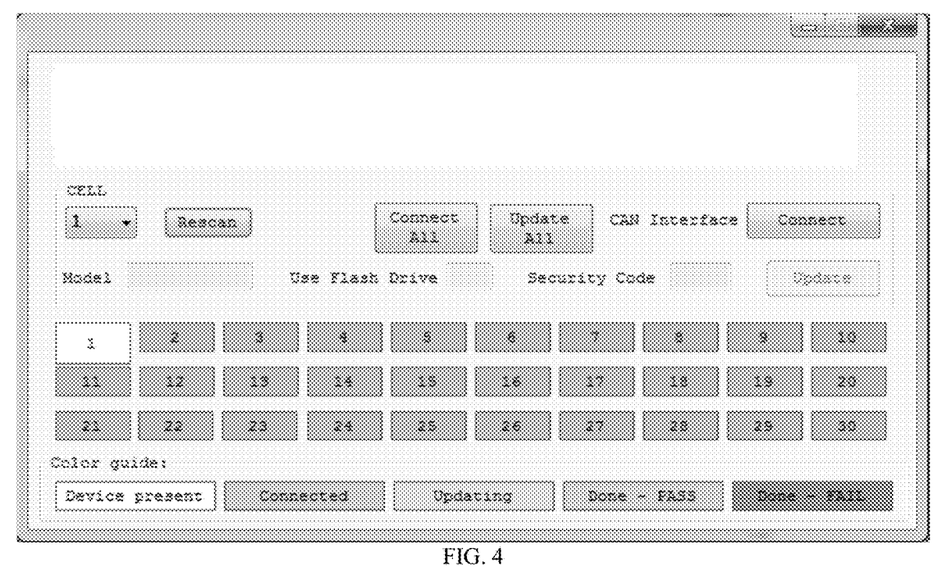
FIG. 4 is a schematic representation of a user interface for an upgrading system, in accordance with an embodiment.
Figure 5:
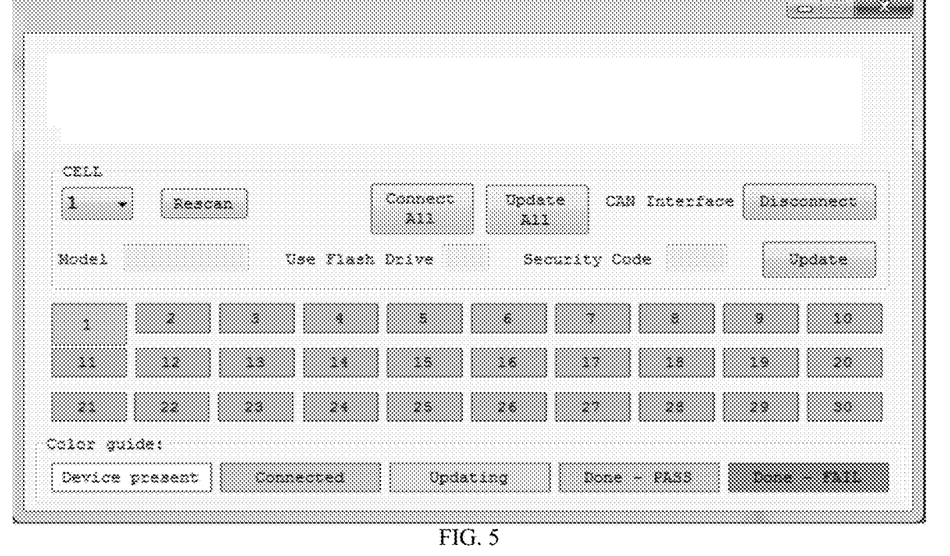
FIG. 5 is a schematic representation of a user interface for an upgrading system, in accordance with an embodiment.

At step 130 of the method, the upgrading program or algorithm is executed and the system scans for one or more connected radio units. The computer may, for example, automatically detect the radio units as they are connected to the computer, regardless of whether the upgrading program or algorithm is executing. According to an embodiment, the upgrading program or algorithm comprises a user interface that guides a user through the upgrade process. For example, referring to FIG. 3 is a representation of the user interface in which information about up to 30 different radio units can be displayed. As shown in FIG. 3, however, in this representation no radio units are currently connected to the system. In other words, there are no blocks showing "Device present." In contrast, referring to FIG. 4, in one embodiment, a radio unit is detected in block 1, and it is showing "Device present." In FIG. 5, in one embodiment, a radio unit is detected at block 1, and it is showing "Connected." The device in block 1 is now ready for upgrading.

At optional step 132 of the method, if the system fails to detect one or more of the radio units which are connected or believed to be connected to the system, then the system may rescan the attached units. The rescan may be automatic or may be activated manually. For example, according to one embodiment, a rescan is always performed. According to another embodiment, a rescan is activated if, for example, a unit is attached to lead or wire #5 and is detected and a unit is attached to lead or wire #6 and is detected, but there is no unit detected for lead or wire #6. According to another embodiment, a rescan is activated only if a user determines that a radio unit is attached but was not detected in the initial scan.

Figure 6:
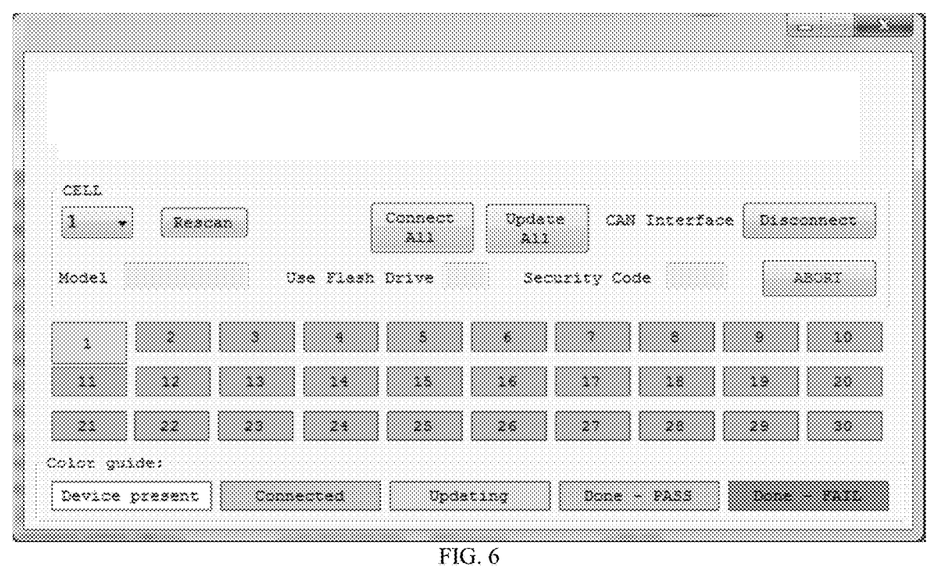
FIG. 6 is a schematic representation of a user interface for an upgrading system, in accordance with an embodiment.

At step 140 of the method, the system begins the upgrade process. This step may be initiated only manually by a user, or automatically after a period of time, or automatically after a rescan, for example. According to an embodiment, the upgrade process may be automatically or within a certain predetermined or preprogrammed amount of time after all radio units are indicated as "Connected," similar to block 1 in FIG. 5. Referring to FIG. 6, in one embodiment, the system is beginning the update process and each of the connected blocks now indicates "Updating." According to an embodiment, the operation can be aborted by clicking on a desired block or cell and then clicking an "ABORT" button.

According to an embodiment, the upgrade system can automatically communicate with each attached radio unit and query the radio unit for information. For example, the upgrade system can obtain information from the attached radio units about their make, model, software version, and other information. As a result, the upgrade system can evaluate the radio unit and the loaded software in order to determine whether an upgrade is necessary. According to an embodiment, the upgrading system comprises a database of radio units and available upgrades. The system can consult this database with the information obtained from the radio units in order to determine which upgrades are available. According to an embodiment, the upgrading system comprises one or more or the available upgrades stored in its memory. Accordingly, the upgrading system will be able to automatically determine which upgrade is available for a radio unit, can locate that upgrade package in its memory, and download and install the upgrade to the radio unit.

According to another embodiment, the upgrading system may require an external source to provide one or more of the required upgrade packages. For example, the system may determine that a specific upgrade package is required to upgrade one or more of the attached radio units, and will use the user interface to prompt the user to provide the upgrade package. The upgrade package may then be provided by one or more flash drives, external storage, or a variety of other sources. The system may automatically retrieve the required upgrade package from an online source via a wired and/or wireless network.

The system then installs and activates the radio unit upgrade. According to an embodiment, the system may power down and power back up a radio unit, and/or may otherwise test the radio unit to ensure that the software upgrade was successful.

According to another embodiment, the upgrading system may determine that no upgrade is necessary for the radio unit. For example, the radio unit may provide information to the upgrading system which allows the system to determine that the radio unit has the most recent available software version already installed.

Figure 8:
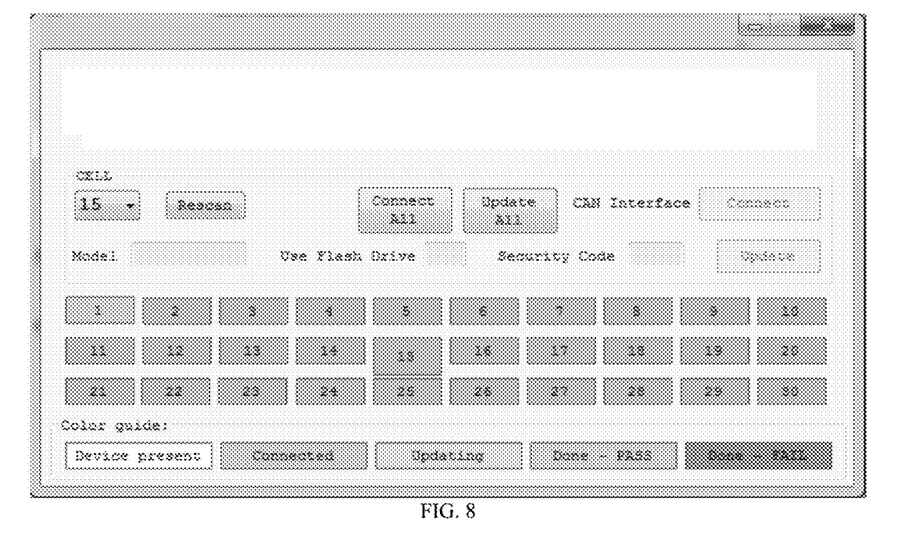
FIG. 8 is a schematic representation of a user interface for an upgrading system, in accordance with an embodiment.

At step 150 of the method, the system receives an indication from the radio unit that the upgrade package was successfully installed and/or is functioning properly. This may be in response to a test by the system, or may be automatically provided to the system by the radio unit. For example, the radio unit may ping the computer system if the upgrade package is successfully installed and is operating properly. Referring to FIG. 8, in one embodiment, the upgrade was successful and block #1 reports "Done—PASS."

Figure 7:
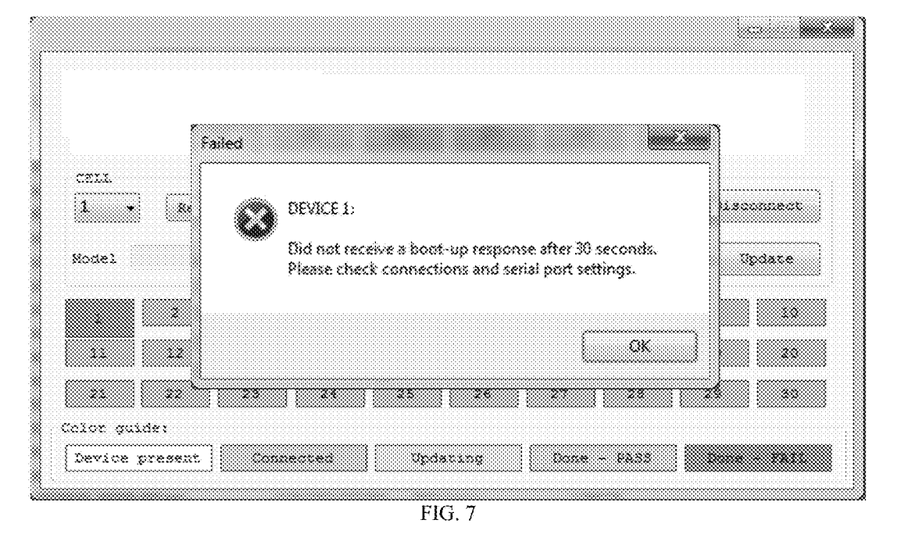
FIG. 7 is a schematic representation of a user interface for an upgrading system, in accordance with an embodiment.

According to an embodiment, the upgrading system may alternatively receive an indication from the radio unit that the upgrade package was NOT successfully installed and/or is NOT functioning properly. Referring to FIG. 7, in one embodiment, the system failed to upgrade radio unit connected at block #1, and the block reports "Done—FAIL." The system is programmed to create a pop-up, icon, warning, sound, light, or other indication that the upgrade has failed. The user may repeat the process with just the failed radio unit. Alternatively, the system may automatically attempt to power down and power back up the radio unit, and/or to install the upgrade package, or to otherwise process the radio unit. Alternatively, the radio unit may be removed by the user for other processing or analysis.

At step 160 of the method, the one or more radio units are removed from the upgrading system. According to an embodiment, the radio units may be powered down automatically or manually, such as when the upgrade is complete, and will be ready for removal. From there, the radio units may be processed or otherwise used or analyzed. According to one embodiment, for example, the radio units are removed and processed for shipping back to the source, such as back to a vehicle dealership, among many other possibilities.

Figure 2:
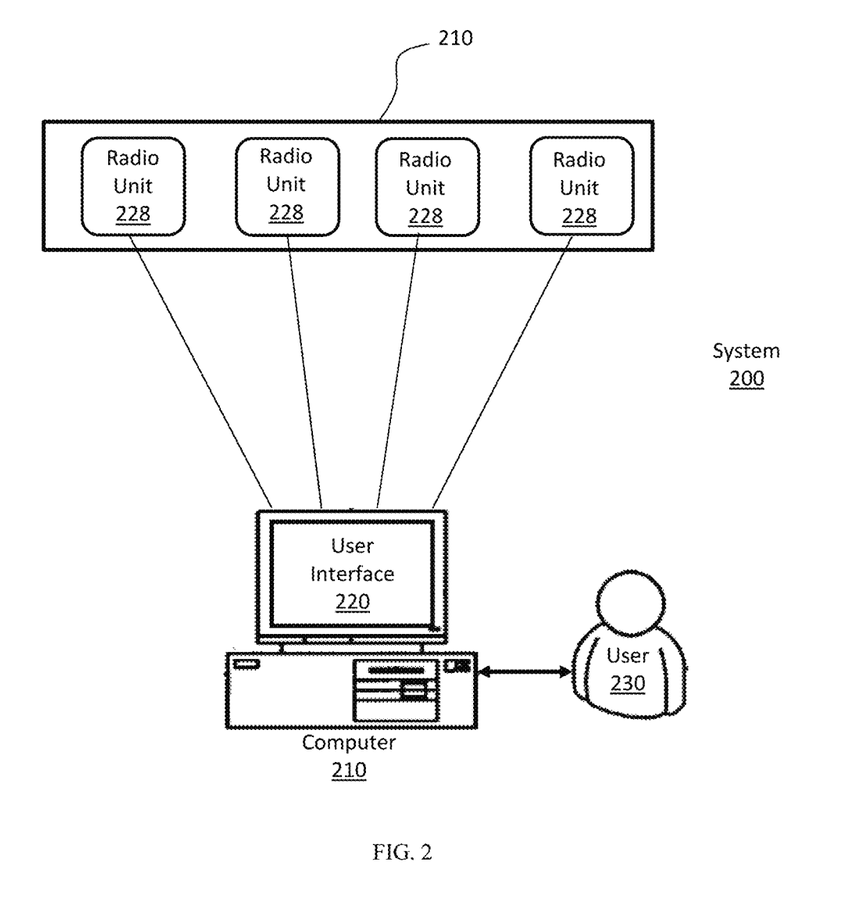
FIG. 2 is a schematic representation of a system for updating the programming of a radio receiver, in accordance with an embodiment.

Referring to FIG. 2, in one embodiment, is a system 200 for updating the programming of a radio receiver. According to an embodiment, the system comprises an upgrading computer 210 with a user interface 220. The upgrading computer 210 may comprise an upgrading program to assist in the upgrading process. Accordingly, the upgrading computer may comprise a non-transitory storage medium that stores the upgrading program or software or algorithm, as well as a processor that executes the software or algorithm. The user interface may be a screen, monitor, or any other display capable of transmitting and/or receiving information from a user.

System 200 also comprises a user 230 which interfaces with the user interface 220 and the upgrading computer 210 to upgrade the plurality of radio units. The user, for example, can connect the radio units to the computer, activate the upgrade program, confirm that upgrade was successful or request a repeat of the upgrade, or any of a variety of other steps in the method or process. The user may, for example, remove the radio units once an upgrade is reported to be successful, and can then prepare the radio units for shipping. Many other functions are possible.

System 200 also comprises a rack 240 comprising a plurality of radio units 250*a, b, c, d*. The optional rack 240 is connected to a power source (not shown). The rack also comprises a plurality of connections to provide power to each of the radio units 250.

The upgrading computer will also comprise an external wired and/or wireless communications link 260 to establish communication with each of the plurality of radio units. The communications link 260 may be a wired link such as an Ethernet cable or any other wired communication means. The communications link 260 may also or alternatively be a wireless connection such as WiFi, Bluetooth, or any other wireless communication means.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for upgrading software stored on a hardware unit using an upgrade system comprising a hardware rack and a computer, the method comprising the steps of:
   receiving a plurality of vehicle hardware units from a hardware unit providing entity, wherein each of the plurality of vehicle hardware units is identified by the hardware unit providing entity as requiring or possibly requiring a software update, wherein each of the plurality of vehicle hardware units are received from the hardware unit providing entity after being removed from a vehicle, and further wherein the hardware unit providing entity is a vehicle dealership;
   connecting each of the received plurality of vehicle hardware units to each of:
      (1) the hardware rack of the upgrade system, wherein the hardware rack provides power to each of the plurality of vehicle hardware units via a first wired connection; and
      (2) the computer of the upgrade system via a second, wired connection, wherein the computer comprises an upgrade algorithm, such that all of the received plurality of vehicle hardware units are concurrently receiving power from the hardware rack and are concurrently connected to the computer;
   scanning, by the upgrade algorithm, for the presence of the plurality of vehicle hardware units;
   querying, by the upgrade algorithm, each of the plurality of vehicle hardware units for information about the software stored on the respective hardware unit;
   determining, by the upgrade algorithm, that an upgrade is available for the software stored on at least one of the plurality of vehicle hardware units, comprising comparing the information about the software stored on the respective hardware unit to a database comprising information about software and available upgrades;
   installing the available upgrade on the at least one of the plurality of vehicle hardware units;
   receiving, from the upgrade algorithm, an indication that the installation was successful on at least one of the plurality of vehicle hardware units; and
   returning each of the plurality of vehicle hardware units to the respective hardware unit providing entity.

2. The method of claim 1, wherein the hardware unit is a radio unit.

3. The method of claim 1, wherein the hardware unit is a GPS unit.

4. The method of claim 1, wherein at least one of the plurality of vehicle hardware units comprise software which is different from software stored on at least one of the remainder of the plurality of vehicle hardware units.

5. The method of claim 1, further comprising the steps of:
   receiving, from the upgrade algorithm, an indication that the installation was not successful on at least one of the plurality of vehicle hardware units;
   re-installing the available upgrade on the at least one of the plurality of vehicle hardware units; and
   receiving, from the upgrade algorithm, an indication that the installation was successful on the at least one of the plurality of vehicle hardware units.

6. The method of claim 1, wherein said querying step comprises querying each of the plurality of vehicle hardware units for information about a make and/or model of the hardware unit.

7. A system for upgrading software stored on a hardware unit, the system comprising:
   a plurality of vehicle hardware units received from a hardware unit providing entity, wherein each of the plurality of vehicle hardware units comprises stored software and is identified by the hardware unit providing entity as requiring or possibly requiring a software update, wherein each of the plurality of vehicle hardware units are received from the hardware unit providing entity after being removed from a vehicle, and further wherein the hardware unit providing entity is a vehicle dealership;
a hardware unit rack into which the plurality of vehicle hardware units is connected such that all of the received plurality of vehicle hardware units are concurrently receiving power from the hardware rack, wherein the hardware unit rack provides power to each of the connected plurality of vehicle hardware units via a first connection;
a wired communications link;
an upgrading computer connected to each of the plurality of vehicle hardware units by the wired communications link such that all of the received plurality of vehicle hardware units are concurrently connected to the upgrading computer, wherein the upgrading computer comprises a processor configured to:
(i) scan to confirm that each of the plurality of vehicle hardware units is connected to the upgrading computer;
(ii) query each of the plurality of vehicle hardware units for information about the software stored on the respective hardware unit;
(iii) determine that an upgrade is available for the software stored on at least one of the plurality of vehicle hardware units, comprising comparing the information about the software stored on the respective hardware unit to a database comprising information about software and available upgrades;
(iv) install the available upgrade on the at least one of the plurality of vehicle hardware units; and
(v) provide an indication that the installation was successful on at least one of the plurality of vehicle hardware units; and
returning each of the plurality of vehicle hardware units to the respective hardware unit providing entity.

8. The system of claim 7, wherein the hardware unit is a radio unit.

9. The system of claim 7, wherein at least one of the plurality of vehicle hardware units comprise software which is different from software stored on at least one of the remainder of the plurality of vehicle hardware units.

10. The system of claim 7, wherein the processor is further configured to:
provide an indication that the installation was not successful on at least one of the plurality of vehicle hardware units; re-install the available upgrade on the at least one of the plurality of vehicle hardware units; and
provide an indication that the installation was successful on the at least one of the plurality of vehicle hardware units.

11. The system of claim 7, wherein the processor is further configured to query each of the plurality of vehicle hardware units for information about a make and/or model of the hardware unit.

12. A method for upgrading software stored on a hardware unit, the method comprising the steps of:
providing an upgrade system, the upgrade system comprising:
(i) a plurality of vehicle hardware units, each of the plurality of vehicle hardware units received from a hardware unit providing entity, wherein each of the plurality of vehicle hardware units comprises stored software and is identified by the hardware unit providing entity as requiring or possibly requiring a software update and further wherein each of the plurality of vehicle hardware units are received from the hardware unit providing entity after being removed from a vehicle, and further wherein the hardware unit providing entity is a vehicle dealership;
(ii) a wired communications link;
(iii) an upgrading computer comprising a processor, wherein the upgrading computer is concurrently connected to each of the plurality of vehicle hardware units by the wired communications link; and
(iv) a hardware rack configured to receive each of the plurality of vehicle hardware units, and
further configured to provide power to each of the plurality of vehicle hardware units such that all of the received plurality of vehicle hardware units are concurrently receiving power from the hardware rack;
querying, by the processor, each of the plurality of vehicle hardware units for information about the software stored on the respective hardware unit;
determining, by the processor, that an upgrade is available for the software stored on at least one of the plurality of vehicle hardware units, comprising comparing the information about the software stored on the respective hardware unit to a database comprising information about software and available upgrades;
installing the available upgrade on the at least one of the plurality of vehicle hardware units;
providing an indication that the installation was successful on at least one of the plurality of vehicle hardware units;
receiving, from the upgrade algorithm, an indication that the installation was not successful on at least one of the plurality of vehicle hardware units;
re-installing the available upgrade on the at least one of the plurality of vehicle hardware units;
receiving, from the upgrade algorithm, an indication that the installation was successful on the at least one of the plurality of vehicle hardware units; and
returning each of the plurality of vehicle hardware units to the respective hardware unit providing entity.

13. The method of claim 12, wherein the computer further comprises a user interface, and wherein the indication is provided via the user interface.

14. The method of claim 12, wherein the hardware unit is a radio unit.

15. The method of claim 12, wherein at least one of the plurality of vehicle hardware units comprise software which is different from software stored on at least one of the remainder of the plurality of vehicle hardware units.

16. The method of claim 12, wherein said querying step comprises querying each of the plurality of vehicle hardware units for information about a make and/or model of the hardware unit.

* * * * *